United States Patent Office 2,791,913
Patented May 14, 1957

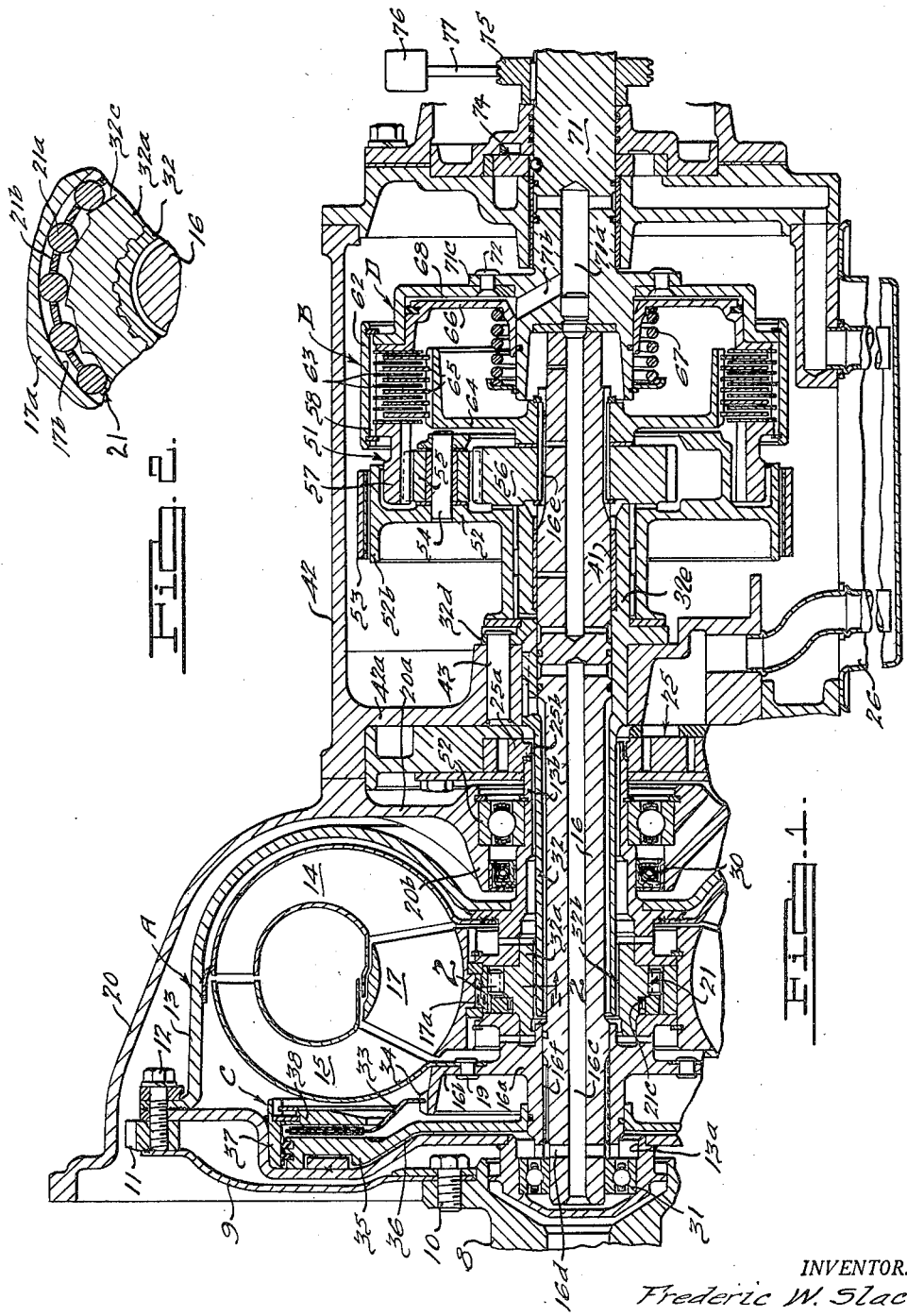

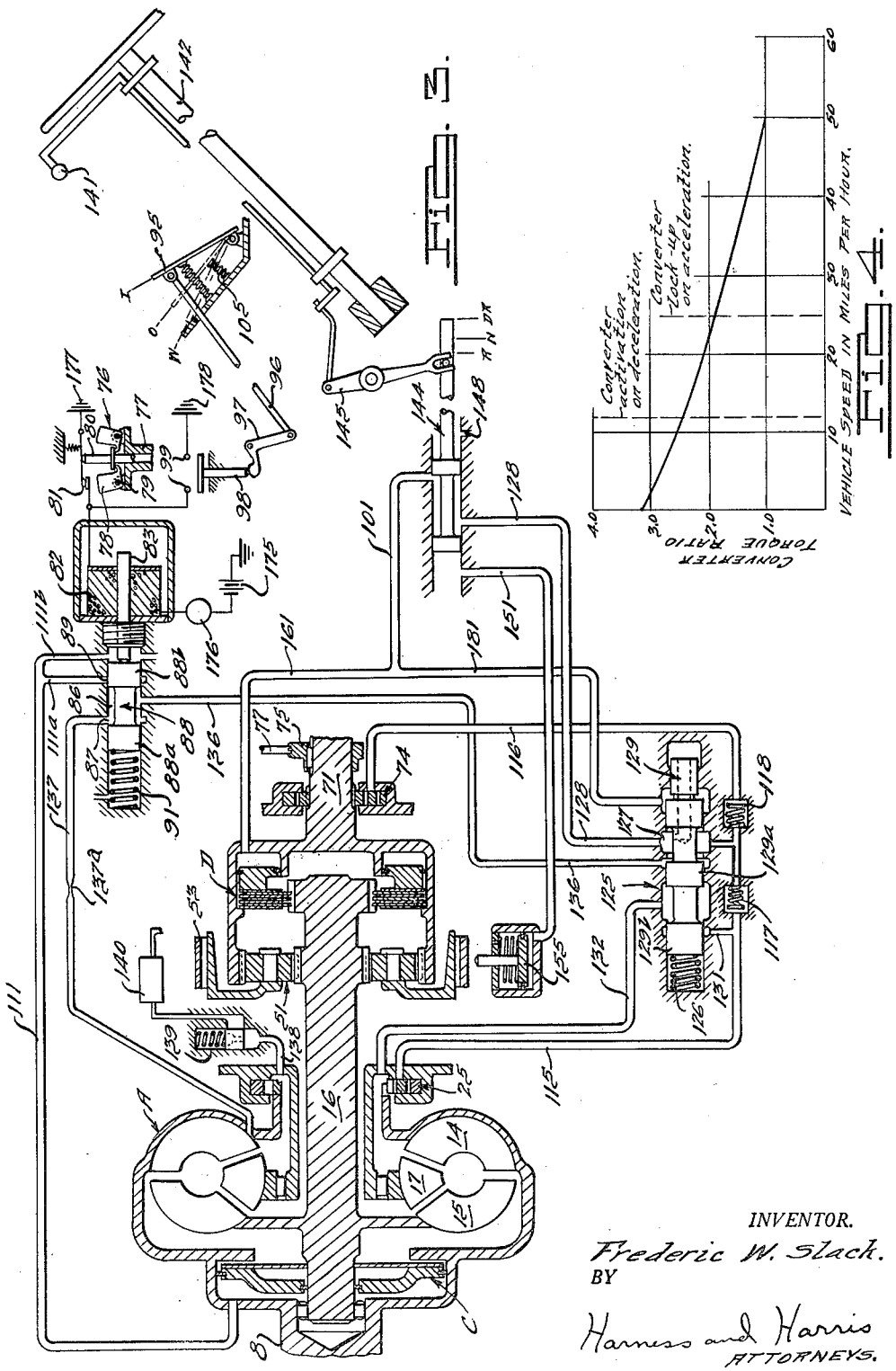

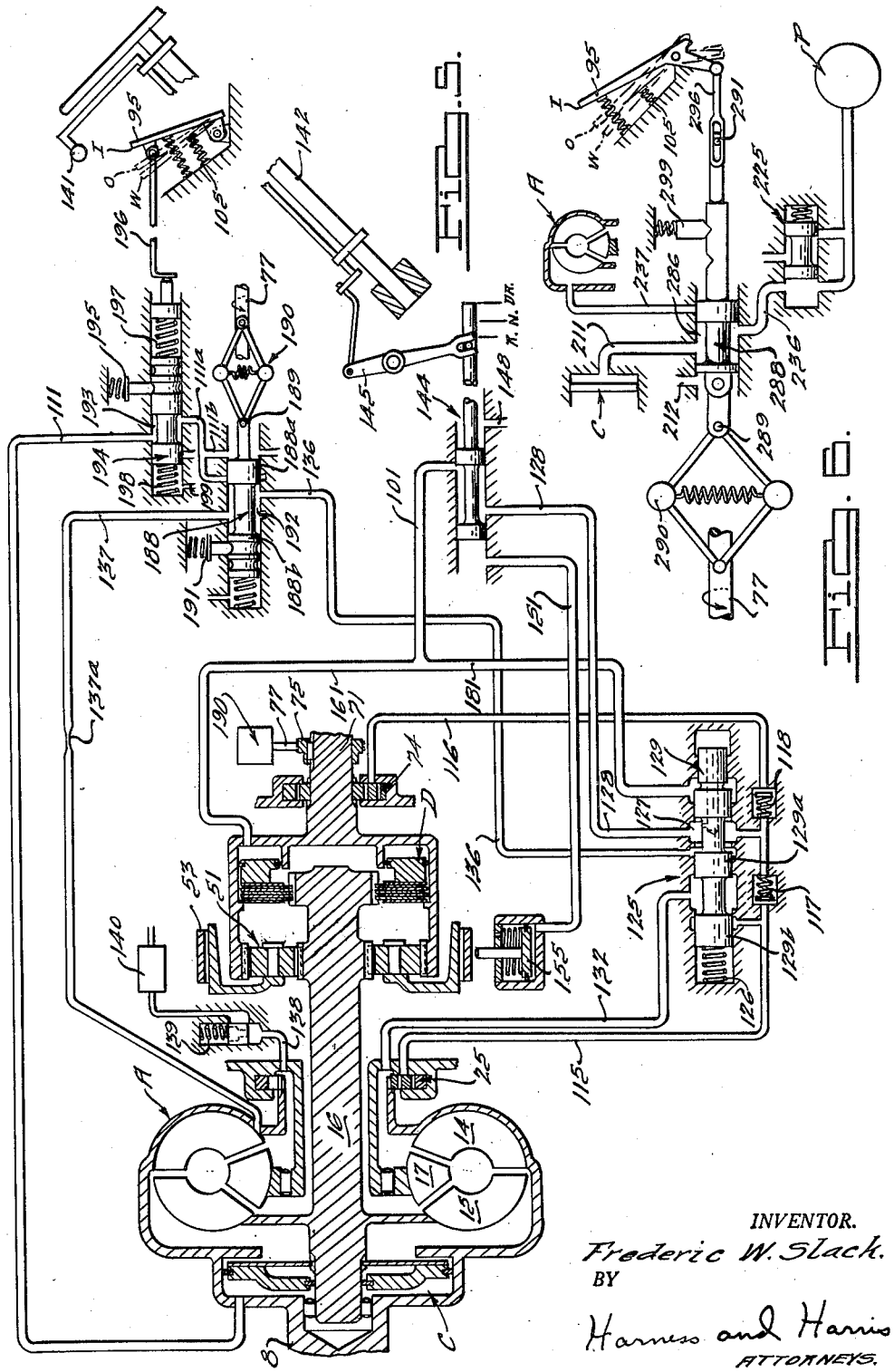

2,791,913

TRANSMISSION AND CONTROLS THEREFOR

Frederic W. Slack, Detroit, Mich., assignor to Chrysler Corporation, Highland Park, Mich., a corporation of Delaware Application September 8, 1949, Serial No. 114,636

2 Claims. (Cl. 74—472)

This invention relates to a hydrokinetic power transmitting unit particularly adapted for use in motor vehicle drive, the transmitting unit having associated therewith a simplified form of speed responsive control system.

It is a primary object of this invention to provide a transmission unit comprising a torque converter unit having a relatively high torque multiplying ratio in combination with a simplified form of reverse and direct drive gear unit wherein only the higher torque multiplying ratios of the converter unit are normally used for starting acceleration in the lower speed ranges after which the transmission control system effects an automatic lock-up of the torque converter unit so as to provide a positively connected, cruising, forward, direct drive that may be kicked down in the higher speed ranges to provide a high speed accelerating ratio utilizing the lower torque multiplying ratios of the converter unit. This transmission arrangement also includes control means whereby the direct drive may be automatically downshifted to the starting, low speed, high torque multiplying, accelerating ratio at the most advantageous point.

It is a further object of this invention to provide an efficient, simplified, power transmission unit that is completely automatic for normal forward drive yet one that includes a driver controlled downshift from direct drive to a torque multiplying ratio particularly adapted for accelerating purposes during cruising drive.

It is an additional object of this invention to provide a transmission unit comprising a hydrokinetic torque converter in combination with a simplified form of gear unit wherein the torque converter is normally used only in its higher torque multiplying ratios where its advantages are most significant and thereafter the torque converter unit is by-passed and a positive, two-way, forward drive provided for the cruising speed range, the lower torque multiplying ratios of the torque converter being reserved for use as a driver controlled accelerating ratio for emergency use or high speed acceleration.

It is another object of this invention to associate a hydrokinetic torque converter with a direct and reverse drive gear unit in such a manner that substantially a one-step upshift from starting to direct drive is automatically effected and a two-step downshift from direct to the starting drive ratio is obtainable by the operator prematurely overruling the automatically operated, single step, downshift controls.

It is a further object of this invention to provide an efficient, flexible, simplified form of power transmission unit having a control system that is characterized by smoothness of operation during speed ratio changes.

It is another object of this invention to provide a power transmitting unit including a hydrokinetic torque multiplying device wherein speed sensitive controls alone are utilized for effecting the automatic changes in the speed ratio drive transmitted by the power unit, the speed sensitive controls being arranged such that they may be overruled by operator operated controls to provide means for improving the flexibility and overall operating characteristics of the power transmitting unit.

It is another object of this invention to provide a torque converter driven power transmitting unit wherein a novel and simplified form of speed responsive control system is used to provide an automatically operable power transmitting unit, the automatically operable controls being arranged such that they may be overruled by operator operable controls to increase the flexibility of the unit.

Other objects and advantages of this invention will become apparent from the attached specification and the related drawings wherein:

Fig. 1 is a partial sectional elevation of the power transmitting unit embodying this invention;

Fig. 2 is a fragmentary sectional elevation taken along the line 2—2 of Fig. 1;

Fig. 3 is a schematic diagram of one form of control system for this transmission unit;

Fig. 4 is a graph that discloses certain operating characteristics of this power transmission unit, the graph showing the torque multiplying ratios of the torque converter plotted against the speed of the vehicle driven by the transmission unit;

Fig. 5 is a schematic diagram of another form of control system for this power transmission unit; and Fig. 6 is a schematic diagram of a portion of still another form of control system for this power transmission unit.

The invention disclosed herein relates to modified forms of controls for the power transmitting unit disclosed in the co-pending application of Frederic W. Slack, Serial No. 84,435, filed March 30, 1949, now Patent No. 2,707,887.

Fig. 1 of the drawings discloses the hydrokinetic torque converter unit A employed with this transmission unit. Converter unit A is adapted to drivingly connect a prime mover such as a motor vehicle engine to a driven member such as the transmission input shaft 16 of the gear type transmission unit B, subsequently described in detail. The reference numeral 8 represents an end portion of a driving member, such as the engine crankshaft of a motor vehicle power unit. The shaft 8 is drivingly connected to the axially flexible drive transmitting plate 9 by the screw means 10. The drive transmitting plate 9 has an engine starter ring gear 11 mounted on its periphery by the bolt means 12. Also drivingly connected to the drive plate 9 by the bolt means 12 is the torque converter casing 13 within which are mounted the various converter components, namely, the impeller member 14, the turbine or runner member 15, and the guide wheel or reaction member 17.

The vaned impeller wheel 14 is fixedly connected to the converter casing 13 and is accordingly adapted to be rotatably driven by the driving shaft 8. The vaned turbine wheel 15 is drivingly connected by rivet means 19 to a radially extending flange portion 16b formed on the hub member 16a that is connected by splines 16f to the forward end portion of the intermediate shaft member 16.

The intermediate shaft member 16 is adapted to transmit drive from the torque converter unit A to the planetary gear unit B arranged in series with the torque converter unit A. The forward end of intermediate shaft 16 is piloted in the axially extending annular seat 13a formed in the converter casing 13. A ball bearing assembly 31 rotatably supports the forward end of intermediate shaft 16 in the converter housing seat 13a. The rear end portion of intermediate shaft 16 is rotatably supported by a sleeve-type of bearing 41 mounted in the housing 42 of gear unit B in a manner hereinafter more fully described.

The vaned guide wheel 17 is rotatably supported within the converter casing 13 by means of the guide wheel hub portion 17a that is rotatably mounted, by means of a one-way brake device 21, on an axially extending sleeve 32 that is fixed to and projects from the rearwardly positioned, relatively stationary, gear box housing 42. Sleeve 32 has a hub member 32a splined thereto at 32b which hub member supports the overrunning or one-way brake device 21.

As clearly shown in Fig. 2, the one-way brake device 21 comprises rollers 21a mounted within a cage member 21b. The cage member 21b is normally urged into drive transmitting position by means of a tension spring 21c (see Fig. 1). Cam surfaces 32c, formed on the outer peripheral surface of the sleeve hub member 32a, cooperate with the clutch rollers 21a and the outer roller race formed by the bore 17b through the guide wheel hub member 17a. It is thought to be obvious from Fig. 2 that the one-way brake 21 will permit only forward rotary movement (clockwise when looking in the direction of arrows 2—2 of Fig. 1) to be transmitted to guide wheel 17 by the forward rotation of the impeller 14, the brake 21 preventing rotation of the guide wheel 17 in a reverse or counterclockwise direction.

The torque converter unit A (see Fig. 1) includes a gear type oil pump 25 that has a driving gear 25a that is directed connected by pin means 25b to the axially extending flange portion 13b of the rotatable converter casing 13. The pump 25 draws oil from a sump 26 and circulates it through the converter unit A, the transmission lubricating system and the various hydraulically operated control mechanisms associated with this transmission unit (see Fig. 3). The circulation of oil through the converter A, by the pump 25, provides a means for maintaining the converter full of oil whenever shaft 8 is rotating. Furthermore, this circulation of the working fluid through the converter and the lubricating and hydraulically operated control systems provides a means for cooling the converter fluid. Separate oil cooler means, subsequently described, are also provided. A second pump 74, driven by the transmission output shaft 71, is also included in this transmission to provide a source of pressure fluid when the engine is not operating though the output shaft is rotating. This pump 74 will be more fully described in connection with the planetary gear box B.

The relatively stationary outer housing 20 for the converter unit A has a rear wall portion 20a from which there projects a forwardly directed, axially extending, sleeve-like, flange portion 20b. Fixedly mounted in the housing flange 20b by means of a snap ring is a ball bearing assembly 52. The snap ring holds the outer race of bearing assembly 52 against a shoulder formed in the housing flange 20b and prevents either forward or rearward axial shift of the bearing assembly 52. Bearing assembly 52 rotatably supports the axially extending flange portion 13b of the torque converter casing 13. Casing flange 13b is formed with a shoulder portion which seats against the forward edge of the inner race of bearing assembly 52. A snap ring locks the inner race of bearing assembly 52 against the shoulder of the axially extending flange 13b of the converter casing 13. This particular arrangement for anchoring bearing assembly 52 to the associated portions of the housing flange 20b and the casing flange 13b fixedly anchors the casing flange 13b against either forward or rearward axial movement. A suitable fluid seal 30 is mounted between the housing flange 20b and the converter casing flange 13b.

In order to provide means for transmitting a positive, two-way, direct drive from the driving shaft 8 to the intermediate shaft 16 a torque converter lock-up clutch C is provided. The lock-up clutch C includes the radially extending, friction surfaced disc member 33, which member is drivingly connected to the intermediate shaft hub portion flange 16b by the splined connection 34. Cooperatively associated with the disc 33 is a hydraulically operated clutch piston 35 which is slidably mounted on the intermediate shaft hub portion 16a for axial shift with respect thereto. The clutch C includes a cylinder ring 37 fixedly mounted on the converter casing 13 so as to provide a bore 36 for piston 35. The piston member 35 is reciprocably mounted within the bore 36 in cylinder 37. Cylinder 37 also supports a backing plate 38 adapted to cooperate with piston 35 to clampingly engage the friction surfaces of the disc member 33 when piston 35 is moved rearwardly as a result of the admission of pressure fluid to the piston cylinder bore 36. Pressure fluid is supplied to the piston cylinder bore 36 through the bores 16c and 16d in intermediate shaft 16. Spring means (not shown) normally urge the piston 35 forwardly to a disengaged clutch position. It will be noted that when the clutch piston 35 has been moved rearwardly to clampingly engage the disc member 33 with the backing plate 38 then the torque converter impeller member 14 and the turbine member 15 are locked together and a positive direct drive is transmitted from the driving shaft 8 to the intermediate shaft 16. This direct drive by-passes the torque converter unit A and provides a highly efficient, non-slipping drive from the vehicle wheels to the engine that can be used for engine braking during coast drive. The control system associated with the transmission unit is arranged such that the lock-up clutch C will be engaged after the torque multiplying effect of the converter has dropped from its starting drive, high torque multiplication ratio but considerably before the converter unit begins to function as a fluid coupling. By such an arrangement the torque multiplying effects of the converter unit are most advantageously used. With the particular arrangement herein disclosed the torque converter A is designed to have a starting drive torque multipling ratio of approximately 3 to 1 or at least 2.6 to 1 and the lock-up clutch C is arranged to be automatically engaged when the torque multiplying ratio has dropped to approximately 2 to 1 or at least 1.5 to 1. One of the reasons for effecting a lock-up of the torque converter A by clutch C prior to the time the converter unit begins to function as a simple fluid coupling is to provide a torque multiplying ratio of approximately 2:1 that may be brought into operation by a manual kickdown from the cruising direct drive. This feature is more fully explained in the subsequent description of the operation of this transmission unit.

The gear box B includes the planetary type reverse gearing 51 and the planetary unit direct drive clutch mechanism D. The gear box housing 42 includes a forward wall portion 42a to which is connected by pin means 43 a radially extending flange 32d of the axially extending hollow sleeve member 32. The forward portion of sleeve 32 supports the one-way brake 21 while the rear portion 32e of sleeve 32 provides a journal support for the sleeve bearing 41. Sleeve portion 32e also rotatably supports the hub portion of the reverse gear planet pinion carrier 52. Pinion carrier 52 has a peripheral flange portion 52b adapted to be releasably engaged by a braking band 53. Pinion carrier 52 has pinion pins 54 to rotatably support a plurality of planet pinion gears 55, only one of which is shown in Fig. 1.

Splined to the rearwardly extending end of intermediate shaft 16, as indicated at 16e, is the sun gear 56 of the reverse gearing 51. Sun gear 56 is arranged to meshingly engage the planet pinion gears 55 so as to effect rotation thereof. Also meshingly engaging the planet pinion gears 55 is the annulus gear 57. Annulus gear 57 is drivingly connected by splines or the like 58 to the drum member 62 of the clutch D. Drum 62 is fixedly connected to the output shaft 71 by means that are subsequently described.

Direct drive clutch D includes the drum member 62, the annular spider member 64 and the axially shiftable piston member 66. Drum member 62 has drivingly mounted thereon the friction discs 63 which are adapted to be releasably engaged with the friction discs 65 drivingly mounted on the spider member 64. Spider member 64 is drivingly connected to the rear end portion of intermediate shaft 16 by splines or the like as indicated at 16e. The axially shiftable piston 66 is adapted to be moved forwardly to effect engagement of direct drive clutch D as a result of the admission of pressure fluid to the cylinder bore 68 in the cylinder-like drum member 62. Pressure fluid is admitted to the cylinder bore 68 through the shaft bores 71a and 71b in the normally driven or output shaft 71. Spring means 67 normally urges the piston member 66 rearwardly to a disengaged clutch position. Drum member 62 of direct drive clutch D is drivingly connected to a radially extending flange 71c on driven shaft 71 by the rivet means 72. It is thought to be obvious that when direct drive clutch D is engaged and the band 53 of the planetary reversing gear mechanism 51 released, then drive will be transmitted directly from intermediate shaft 16 to output or driven shaft 71 through the engaged clutch members 64, 65, 63, 62. At the times torque converter lock-up clutch C and direct drive clutch D are both engaged then a positive, two-way, direct drive is transmitted from driving shaft 8 to driven shaft 71 by a power transmitting train that by-passes the torque converter unit A and the planetary gearing 51. Such a drive is highly efficient for cruising drive for it eliminates the slip that is inherent in a hydrokinetic torque converter unit and it also provides a positively connected power transmitting train that will provide engine braking for coast drive. Clutch D is always engaged before forward drive is transmitted to the driven shaft 71 by the transmission unit and this clutch D remains engaged during all forward drive. As a result of this arrangement whereby there is no engagement or disengagement of clutch D during forward drive, a very smooth drive is obtainable.

Drivingly connected to the output shaft 71 is a second gear type oil pump 74. Oil pump 74 is arranged to draw fluid from the oil sump 26 and circulate it through the hydraulically operated control and lubrication systems of the transmission unit whenever the output shaft 71 is rotating. Consequently, pump 74 provides pressure fluid for operation of the transmission unit during a pushed or towed start even if engine driven pump 25 is inoperative due to a dead engine. Suitable controls, such as the arrangement shown in Fig. 3, may be provided to have pump 74 automatically take over the supply of pressure fluid for the transmission unit whenever the speed of output shaft 71 exceeds a certain predetermined value thereby relieving the front pump 25 of its working load after the engine unit (not shown) has begun to drive the transmission output shaft 71. This arrangement whereby the front pump 25 merely by-passes lubricant during most of the driving time relieves the engine of a material load and improves operating efficiency.

Also drivingly mounted on the output shaft 71 is a drive pinion 75 that transmits drive from shaft 71 to the driven shaft 77 of the speed responsive, centrifugal force operated governor mechanism 76. Governor 76 provides the means for automatically controlling operation of the torque converter lock-up clutch C. From Fig. 3 it is thought to be obvious that a predetermined rotative speed of shaft 77 will cause governor weights 78 to swing radially outwardly about their pivot centers 79 so as to cause the inwardly disposed fingers on the weights 78 to engage the collar on shaft 80 and raise the shaft 80. Raising shaft 80 will open the spring-pressed switch contacts 81 that normally control energization of the solenoid 82. Solenoid 82 operates the control valve 88 that controls operation of lock-up clutch C.

The governor mechanism 76 herein disclosed is preferably designed so that on acceleration of the vehicle driven by this power transmission unit the governor will cause an opening of the switch contacts 81 when the vehicle has attained a road speed of approximately twenty-five miles per hour. However, on deceleration of the vehicle the governor contacts 81 are not closed until the vehicle road speed has dropped to approximately twelve miles per hour. By providing a governor that closes the contacts 81 on deceleration at a relatively low road speed, compared to its point of activation on acceleration, it is possible to maintain the transmission unit in its cruising direct drive ratio during the major portion of its cruising drive and the automatic shifts between direct cruising drive and the torque converter transmitted accelerating drive are maintained at a minimum. This tends to improve operating efficiency and to give smoother performance.

The electrical circuit associated with the control valve operating solenoid 82 includes the usual grounded battery 175 which is connected through the conventional ignition switch 176 to the solenoid 82. Solenoid 82 is connected to ground at 177 and 178 through a pair of parallel branch lines. The circuit to ground at 177 goes through the governor controlled switch contacts 81 while the circuit to ground at 178 goes through the switch contacts 99 which are adapted to be controlled by a manually operated mechanism associated with the conventional engine acceleration pedal 95. In the description of this invention the term "manually operated" is to be given its broader interpretation to include both hand and foot operated mechanisms. The manually operated control mechanism for switch contacts 99 that is associated with the accelerator pedal 95 is subsequently described in detail.

The control system shown in Fig. 3 also includes the conduits 115 and 116 which connect the pumps 25 and 74 respectively with a pressure regulator valve 125. Spring 126 of pressure regulator valve 125 determines the pressure that is to be maintained in the pressure fluid supply conduit 128. A pump output pressure of approximately 90 pounds per square inch has been found to be satisfactory for operation of this transmission control system. However, the actual pressures of the fluid delivered to supply conduits 128 and 136 may be varied by the control of pressure fluid admitted to conduit 181. As this pressure control feature relates to operation of the pressure regulator valve 125 which element does not form a part of this invention, additional description of the valve 125 will be omitted. The pump output conduits 115 and 116 each include check valves 117 and 118 to insure a suitable pressure head in the pumps at all times. With the control arrangement shown the pump 25 supplies the fluid pressure for starting drive under ordinary conditions and as the speed of output shaft 71 increases the pump 74 automatically takes over and feeds the supply conduit 128. As pump 74 comes into operation the pressure fluid supplied therefrom is transmitted to chamber 127 of pressure regulator valve 125 and this pressure acts on land 129a of piston valve 129 and moves piston valve 129 towards the left compressing spring 126. Movement of piston valve 129 to the left displaces the valve land 129b so as to connect conduit 131 to by-pass conduit 132 thereby providing a means for by-passing the output of the pump 25. Upon the operation of either pump 25 or 74 the fluid pressure in chamber 127 is always sufficient to move plunger valve 129 slightly to the left to connect chamber 127 with conduit 136 which supplies pressure fluid to the torque converter unit A and the lock-up clutch C through the control valve 88.

The pressure fluid supply conduit 136 connects the chamber 127 of the regulator valve 125 to the cylinder 86 that contains the control valve 88. Control valve 88 has a land 88a that may be moved across the port 87 that connects the cylinder bore 86 and the conduit 137. The position of land 88a thus controls the delivery of pressure fluid to conduit 137 and to the torque converter A. Control valve 88 also has a land 88b that may be moved across the port 89 that connects the bore 86 with the conduit 111a. The position of valve land 88b thus controls the delivery of pressure fluid to the lock-up clutch C. A spring 91 mounted in cylinder bore 86 is arranged to normally urge the valve 88 towards the right so as to move valve land 88a across port 87 and cut off the supply of pressure fluid to the converter A. When valve 88 is moved to the right by spring 91 then port 89 is uncovered by land 88b and pressure fluid from conduit 136 is directed through bore 86 into conduits 111a and 111 to effect engagement of the torque converter lock-up clutch C.

The solenoid 82 has a plunger bar 83 reciprocably mounted therein and arranged such that energization of the solenoid 82 will move plunger bar 83 towards the left and shift the control valve 88 towards the left to the position shown in Fig. 3. In this position pressure fluid from conduit 136 is directed into the torque converter A through conduit 137 and the lock-up clutch C is disengaged for conduit 111 is being drained through the branch conduit 111b. Port 89 is closed off from supply conduit 136 by the valve land 88b when solenoid 82 is energized. When solenoid 82 is deenergized then spring 91 shifts the valve 88 towards the right in the manner previously described and pressure fluid from supply conduit 136 will be directed through valve chamber 86 and conduit 137 into the torque converter A. A restriction 137a in conduit 137 acts as a volume control means for the pressure fluid supplied to the converter A. A converter pressure relief valve 139 is also associated with the converter pressure fluid supply system to control the pressure of the fluid within the converter A.

In addition to providing the speed responsive governor mechanism 76 for automatically controlling energization of solenoid 82 and operation of valve 88, this transmission control system includes a manually operated control arranged in parallel with the governor operated control 76. The manually operated control comprises the engine accelerator pedal 95 which is connected by the rod linkage 96 to the pivotally mounted bellcrank lever 97. Lever 97 is arranged to be rotated to effect vertical reciprocation of switch contact 98. On ordinary operation of the accelerator pedal 95 between the closed throttle or idle position indicated by the letter I and a nearly wide open throttle position indicated by the letter O, the movement of bellcrank lever 97 will be such that the contact 98 will not engage the contacts 99, therefore the solenoid 82 will be under the complete control of the governor mechanism 76. However, if it is desired to provide a parallel circuit to energize the solenoid 82 and thereby provide means to overrule the automatically operated governor control 76, then accelerator pedal 95 can be completely depressed to the wide open throttle position indicated by the letter W and this will close switch contacts 98, 99 and energize the solenoid 82. A spring 105 may be associated with the accelerator pedal 75 so that it will be engaged during the movement of pedal 95 from the O to W positions, which roughly represent the last five or ten degrees of throttle opening movement of the accelerator pedal 95. The spring 105 prevents unintended depression of the accelerator pedal 95 to the position indicated by the letter W and thus prevents accidental disengagement of the torque converter lock-up clutch C.

The pressure fluid directed through the converter A is returned to the supply sump 26 through the conduit 138 that is also connected to the lubrication system and to suitable pressure fluid cooling means 140. Conduit 138 includes the pressure relief valve 139 for controlling the pressure of the fluid supplied to the converter unit A. This valve 139 maintains a suitable pressure in the converter unit to keep the converter full of fluid at all times. This valve 139 is set so that the pressure in the converter is considerably less than the pressure that is applied to the lock-up clutch C to effect actuation thereof. In this way there is a sufficient pressure differential in the clutch C to provide for quick, easy operation of the clutch C.

The manual controls for this transmission unit include the drive selector lever 141 which is usually rotatably mounted on the conventional vehicle steering column 142. Control lever 141 is connected to manually operated piston type control valve 144 by the linkage arrangement 145. Drive selector lever 141 has three positions, a centrally located Neutral position, between the terminally located forward Drive position and the Reverse drive position. The three positions are denoted by the letters N, DR and R, respectively, in Fig. 3.

*Operation*

When the transmission driving engine is operating and drive selector lever 141 (see Fig. 3) is in the Neutral position then manual control valve 144 is positioned so that supply conduit 128 cannot direct pressure fluid into either the forward direct drive conduit 101 or the reverse drive control conduit 151. Accordingly, neither direct clutch D nor reverse band 53 are in engaged condition and consequently neither a forward nor a reverse drive is transmitted to the output shaft 71. The front pump 25 at this time will merely circulate fluid through the converter A and the lubrication system. The torque converter lock-up clutch C will be disengaged at this time for the ignition system has energized the solenoid 82 due to the governor 76 causing contacts 81 to be closed at all vehicle speeds under approximately twelve miles per hour. With solenoid 82 energized the control valve 83 is shifted towards the left to the position shown in Fig. 3 and consequently pressure fluid from conduit 136 cannot enter the conduit 111 nor the clutch C.

If the drive selector lever 141 is moved to the forward Drive position (as shown in Fig. 3) then pressure fluid from supply conduit 128 passes through the manually operated control valve assembly 144 into conduit 101 from which the pressure fluid will be directed into the conduit 161 so as to engage direct clutch D and condition gear box B for the transmission of a forward direct drive. The engine speed at closed throttle with the valve 144 in its forward Drive position will be such that slip in the torque converter unit A and drag of the associated drive train elements will prevent an actual forward drive being transmitted to the driven shaft 71 even though the direct clutch D is engaged. Subsequently, as the accelerator pedal 95 is depressed to increase the speed of the driving engine unit, the torque converter impeller 14 will be rotated at such a speed that a torque multiplying drive will be transmitted to the converter turbine 15 and the associated driven shaft 16. Shaft 16, being directly connected to output shaft 71 by the direct drive clutch D, thus drives shaft 71 at the torque multiplying ratio which is particularly adapted for vehicle acceleration. Accordingly, during initial forward acceleration the relatively high torque multiplication ratio of the converter unit A is effective and a torque multiplying accelerating drive of approximately 3 to 1 is transmitted by the converter unit A to the output shaft 71. This drive is from driving shaft 8 through torque converter A to turbine driven shaft 16 and then through engaged direct clutch D to output shaft 71.

Subsequently, as the speed of output shaft 71 increases, the speed responsive governor 76 will operate to effect engagement of the torque converter lock-up clutch C and convert the accelerating, relatively high torque multiplying, starting drive into a two-way, positive, direct drive. At a predetermined speed of output shaft 71, approximately twenty-five miles per hour vehicle speed, the governor 76 will open contacts 81 and valve 88 will shift to the right to cause pressure fluid from conduit 136 to be introduced into conduit 111 through valve 88 and this will apply pressure fluid to the lock-up clutch C to effect engagement thereof. The engagement and disengagement of lock-up clutch C will normally take place automatically under control of the speed responsive governor mechanism 76. Lock-up of clutch C will normally occur when the vehicle speed is approximately twenty-five miles per hour during acceleration, and disengagement of the clutch by the governor 76 will occur when the vehicle has decelerated to a speed of approximately twelve miles per hour as previously explained. The torque multiplication ratio is approximately 2 to 1 when converter lock-up occurs (see Fig. 4) and on automatic disengagement of the clutch C by the governor 76 a torque multiplying ratio of approximately 2.5 is available for vehicle acceleration.

If, while travelling in the two-way, locked-up, direct drive, a high speed accelerating drive is desired then a kickdown to a more favorable accelerating ratio may be manually effected by merely depressing the accelerator pedal 95 a predetermined amount, such as to the limit of its downward or throttle opening movement, and this will effect a closing of switch contacts 98, 99 to energize the solenoid 82 and cause a shift of control valve 88 to the left so as to disengage the torque converter lock-up clutch C and bring the torque converter unit A back into operation. From Fig. 4, it will be noted that when the vehicle speed is above the speed at which automatic lock-up of the converter unit A occurs, still, there is considerable torque multiplication ratio available for high speed accelerating use so it is possible to overrule the automatically operated speed responsive governor 76 and to kickdown from the cruising direct drive to a torque multiplying drive through the converter unit A at any time up to approximately forty miles per hour vehicle speed. At cruising speeds of twenty to forty miles per hour a kicked-down accelerating ratio of between 2 and 1.2 to 1 is available for high speed accelerating drive.

If while driving up a steep hill or the like, the vehicle speed should attain twenty-five miles per hour so as to normally effect an automatic upshift to the positive, two-way direct drive, still the driver may maintain the transmission in its torque multiplying, accelerating, ratio by merely depressing the accelerator pedal 95 to its limit and retain the pedal in that position until the upshift to the cruising direct drive is actually desired. This feature of this transmission control system is also advantageous when it is desired to extend the period of a break-away start or high speed acceleration while operating in congested traffic. Thus it will be seen that this transmission control system provides a means whereby the normally automatic upshift from the torque multiplying accelerating drive to the cruising direct drive may be delayed and the period of torque multiplication extended if such operation should be advantageous to the vehicle operator.

Reverse drive may be obtained by moving the drive selector lever 141 to the Reverse position. This positions the manually operated control valve 144 in such a position that pressure fluid from supply conduit 128 is directed into the reverse band control conduit 151 while forward drive control conduit 101 is blocked off from supply conduit 128. Conduit 101 at this time is opened to the sump 26 through the drain 148 in valve 144 to drain the pressure fluid from the direct drive clutch D. Admission of pressure fluid to conduit 151 actuates the Reverse band piston 155 and applies reverse braking band 53 so that the planetary gearing 51 will transmit a reverse drive from input shaft 8 through the torque converter A and turbine driven shaft 16 to the planetary gearing 51 and then to output shaft 71. Planetary gearing 51 is effective to produce a reverse drive for application of brake band 53 anchors the planet pinion carrier 52 while driving sun gear 56 rotates the annulus gear 57 in a reverse direction. Annulus gear 57 is directly connected to output shaft 71, thus a reverse drive is transmittable through the torque converter unit A to the driven or output shaft 71.

Fig. 5 of the drawings shows a modified form of control system for the previously described power transmission unit wherein the solenoid operated control valve 88 has been replaced by a pair of valves, namely a control valve 188 and a kick-down valve 194. The control valve 188 is similar in construction and operation to the valve 88 shown in Fig. 3 except for the fact that it is positively connected at 189 to the speed responsive governor 190. Governor 190 is directly connected to a shaft 77 that is driven by the transmission output shaft 71 or some other member that is vehicle speed responsive. Governor 190 is adapted to shift control valve 188 towards the right when the vehicle speed reaches approximately twenty-five miles per hour on acceleration and to shift the valve 188 towards the left to the position shown when the vehicle speed reaches approximately twelve miles per hour on deceleration. Suitable spring detent means 191 anchors the valve 188 in either of its two limiting positions and prevents hunting of the valve during operation thereof.

When the vehicle speed is below twenty-five miles per hour it is thought to be obvious that pressure fluid from conduit 136 will enter the converter A through conduit 137 due to the governor 190 positioning the valve 188 at the left end of its cylinder 192. In this position pressure fluid cannot enter conduits 111a and 111 so the lock-up clutch C is disengaged and drains through conduit 111b. However, when a vehicle speed of twenty-five miles per hour is reached then governor 190 will snap valve 188 towards the right end of cylinder 192 and land 188a of valve 188 will uncover the port connection between conduit 111a and cylinder 192 so as to permit pressure fluid from conduit 136 to enter conduits 111a and 111 and thereby effect engagement of the torque converter lock-up clutch C. The land 188b of valve 188 is of such size that it does not close off the connection between cylinder 192 and the conduit 137 when valve 188 has been shifted to the right to effect engagement of clutch C. Consequently pressure fluid is directed into the converter A at all times. The pressure of the fluid within the converter A is maintained at a lower value than the pressure of the fluid directed into the clutch C so as to provide an adequate pressure differential on opposite sides of the clutch C to facilitate operation of the clutch. The pressure of the fluid in the converter A is reduced by means of the relief valve 139 whereas full line pressure is supplied to the clutch C. Ordinarily the clutch operating pressure is about 90 pounds per square inch whereas the pressure of the fluid in the converter is about 45 pounds per square inch.

When the vehicle is operating at a speed above twenty-five miles per hour in the cruising direct drive ratio with the clutch C engaged and it is desired to rapidly accelerate the vehicle, then it is merely necessary to depress the accelerator pedal 95 to the position W which is the limit of its throttle opening movement and the link 196 will transmit motion through spring 197 to the kickdown valve 194 so that valve 194 will be shifted to the left against the force exerted by the valve return spring 198. Movement of kickdown valve 194 to the left will close off the port connection between conduit 111a and the cylinder 193 and prevent the delivery of pressure fluid to clutch C through conduit 111. Movement of valve 194 to the left will also connect conduit 111 to the drain 111b so that clutch C may be readily disengaged. The transmission is now conditioned for a torque multiplying drive through the converter A. Converter A can provide a torque multiplying effect of as much as 2:1 depending on the speed at which the kickdown from direct drive occurs. When the accelerating, torque multiplying drive is no longer required the vehicle operator merely releases the pressure on the accelerator pedal 95 and the spring 198 returns the valve 194 to its normal position at the right end of cylinder 193. Pressure fluid from conduit 111a may once again be directed into the lock-up clutch C provided the vehicle speed is still above twenty-five miles per hour. During normal drive of the vehicle the accelerator pedal will travel between the idle position indicated by the letter I and the nearly wide open throttle position indicated by the letter O. Movement of the pedal 95 between these positions merely compresses spring 197 and does not cause movement of valve 194. The spring detent 195 assists in maintaining the valve 194 in either of its limiting positions.

Fig. 6 is another form of control system for the power transmission unit shown in Fig. 1. This form of the invention is similar to the control system shown in Fig. 5 except for the fact that the pair of control and kickdown valves 188 and 194 have been replaced with a single valve 288 that functions as both a control valve and a kickdown valve. In this control system the pressure fluid from a supply source P, which may be either of the pumps 25 or 74 of the above described transmission unit, is directed through the pressure regulator valve 225 to the supply conduit 236 which conducts it to the bore in the cylinder 286. Reciprocably mounted in cylinder 286 is the valve 288 which is directly connected at 289 to the vehicle speed responsive governor mechanism 290. Governor 290 is drivingly connected to a vehicle speed responsive shaft such as the shaft 77 that is driven from the output shaft 71 of the power transmission unit. Conduit 211 connects the bore in cylinder 286 with the torque converter lock-up clutch C and conduit 237 connects the bore in cylinder 286 with the interior of torque converter A. The pin 291, on the end of valve 288 opposite the end connected to governor 290, is connected through a slotted link 296 to the engine accelerator pedal 95. The slot and pin connection between the valve 288 and link 296 provides a lost motion connection that permits the accelerator pedal 95 to be depressed from its idle position I to its nearly wide open position O without the pedal 95 effecting movement of the valve 288. If pedal 95 is completely depressed to its wide open throttle position W, then the left end of the slot in link 296 picks up the pin 291 on valve 288 and moves the valve towards the right a sufficient distance to cause the valve 288 to close off the connection between conduits 236 and 211 and to simultaneously connect supply conduit 236 to the torque converter pressure fluid supply line 237. The above described movement of valve 288 to the right, by a full depression of the accelerator pedal 95, thus provides a means for manually kicking down the transmission unit from the positive two-way direct drive to the torque multiplying drive through the converter unit.

From Fig. 6 it is thought to be obvious that the governor 290 will automatically position the valve 288 at the right end of cylinder 286 so as to connect conduits 236 and 237 at low vehicle speeds. Thus all starting drive is through the converter unit A until the vehicle speed attains approximately twenty-five miles per hour. When the vehicle speed reaches twenty-five miles per hour the governor 290 will snap the valve 288 over from its position at the right end of cylinder 286 to the position shown in Fig. 6 at the left end of cylinder 286 whereupon the torque converter lock-up clutch C will be engaged. The spring detent means 299 prevents hunting of the valve 288 and makes the shift points of the valve 288 on acceleration and deceleration of the vehicle very definite. When the valve 288 is in the position shown in Fig. 6 the conduits 236 and 211 are connected and the torque converter lock-up clutch C is engaged so the transmission is positively connected for the transmission of the cruising direct drive. Under ordinary conditions the transmission will cruise with the converter locked up until the vehicle speed has dropped to approximately twelve miles per hour at which time the governor 290 will snap the valve 288 towards the right and block off conduit 211 from conduit 236. Conduit 211 will then drain through the drain port 212. With the shift of the valve 288 to the right the transmission is again conditioned for the transmission of the accelerating, torque multiplying drive through the converter A.

If while operating in the cruising direct drive with the lock-up C engaged and the vehicle speed above twelve miles an hour, the operator should desire to rapidly accelerate, it is only necessary to fully depress the accelerator pedal and the link 296 will shift the valve 288 to the right a sufficient distance to close off the supply of pressure fluid to conduit 211 and thereby effect an unlocking of the clutch C and the transmission of drive through the torque converter A.

What is claimed is:

1. In a motor vehicle including an engine accelerator pedal and an engine driven transmission having driving and driven shafts, a hydrodynamic torque converter having a torque multiplication range of approximately 3 to 1 connectible between said shafts adapted to transmit a torque multiplying drive therebetween and a clutch associated with said converter adapted to be engaged to provide means for transmitting a positive direct drive between said shafts and to be disengaged to provide for the transmission of a torque multiplying drive between said shafts through said converter; automatically operated control means responsive only to the speed of the driven shaft to effect engagement of said clutch when the vehicle speed is above a predetermined speed to provide for the utilization of only the higher ratios of the converter torque multiplication range during normal accelerating drive, and to effect disengagement of said clutch when the vehicle speed is below the predetermined speed, and driver operable control means for said clutch adapted to be actuated by said accelerator pedal to effect disengagement of said clutch to thereby provide means to overrule the automatically operated control means for said clutch to provide for the utilization of only the lower ratios of the converter torque multiplication range during high speed accelerating drive, said automatically operated control means comprising a source of pressure fluid connected to a cylinder, a valve movably mounted in said cylinder, a first conduit connected between said cylinder and said converter and a second conduit connected between said cylinder and said clutch, a speed responsive governor operably associated with said driven shaft, a solenoid operably associated with said governor so as to have the energization thereof controlled by said governor, and means actuable by said solenoid and engageable with said valve to effect actuation thereof with changes in speed of said driven shaft, shift of said valve controlling admission and release of pressure fluid to said clutch, and said driver operable control means including means actuable by said accelerator pedal, after a predetermined movement thereof, to vary the energization of said solenoid to thereby effect a disengagement of said clutch.

2. In a control system for a motor vehicle having an engine with an accelerator pedal control, an engine driven transmission having coaxially arranged driving, intermediate and driven shafts, a hydrokinetic torque converter having a torque multiplication ratio of approximately 3 to 1 arranged for transmitting multiplied torque from the driving to the intermediate shaft, a torque converter clutch for directly connecting the driving and intermediate shafts, a direct drive clutch for directly connecting the intermediate and driven shafts, manually operated control means to control engagement of said direct drive clutch, automatically operated control means responsive only to the speed of the driven shaft to control engagement and disengagement of said torque converter clutch, said automatically operated control means being arranged to cause disengagement of said torque converter clutch at relatively low driven shaft speeds when initiating drive through the transmission and to cause engagement of the torque converter clutch when the driven shaft speed has attained a first predetermined relatively high value and while the torque converter is operating in the upper ⅓ of the ratios of its torque multiplication range, said automatically operated means causing disengagement of the torque converter clutch when the speed of the driven shaft has dropped to a second predetermined relatively low value, and operator operable control means to overrule said automatically operated control means and effect disengagement of said torque converter clutch prior to the time said automatically operated means would effect such disengagement so as to provide means for transmitting a torque multiplying drive utilizing the lower twothirds of the torque multiplication range of the torque converter, said automatically operated control means comprising a source of pressure fluid connected to a cylinder, a valve movably mounted in said cylinder, a first conduit connected between said cylinder and said converter and a second conduit connected between said cylinder and said clutch, a speed responsive governor operably associated with said driven shaft, a solenoid operably associated with said governor so as to have the energization thereof controlled by said governor, means actuable by said solenoid and engageable with said valve to effect actuation thereof with changes in speed of said driven shaft, shift of said valve controlling admission and release of pressure fluid to said clutch, and said driver operable control means including means actuable by said accelerator pedal, after a predetermined movement thereof, to vary the energization of said solenoid to thereby effect a disengagement of said clutch.

References Cited in the file of this patent
UNITED STATES PATENTS

| | | |
|---|---|---|
| 2,226,801 | Black | Dec. 31, 1940 |
| 2,260,015 | Fichtner | Oct. 21, 1941 |
| 2,332,593 | Nutt | Oct. 26, 1943 |
| 2,368,684 | Simpson | Feb. 6, 1945 |
| 2,380,677 | Schjolin | July 31, 1945 |
| 2,397,634 | Voytech | Apr. 2, 1946 |
| 2,449,586 | Camagua | Sept. 21, 1948 |
| 2,454,614 | Peterson | Nov. 23, 1948 |
| 2,457,692 | La Brie | Dec. 28, 1948 |
| 2,495,515 | Foley | Jan. 24, 1950 |
| 2,498,600 | Brunken | Feb. 21, 1950 |
| 2,555,702 | Railton | June 5, 1951 |
| 2,568,007 | Jandasek | Sept. 18, 1951 |
| 2,603,109 | Farkas | July 15, 1952 |
| 2,609,706 | Jandasek | Sept. 9, 1952 |

OTHER REFERENCES

Twin Disc Bulletin No. 132, Dec. 18, 1941.
Packard Serviceman's Training Book, May 1949.